United States Patent
Cook

(10) Patent No.: US 6,668,262 B1
(45) Date of Patent: Dec. 23, 2003

(54) METHODS AND APPARATUS FOR MODIFYING A DATABASE

(75) Inventor: Michael R. Cook, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 09/710,602

(22) Filed: Nov. 9, 2000

(51) Int. Cl.⁷ .............................................. G06F 17/30
(52) U.S. Cl. ....................................................... 707/204
(58) Field of Search ................................. 702/202, 204

(56) References Cited

U.S. PATENT DOCUMENTS

| | | | |
|---|---|---|---|
| 5,043,871 A | | 8/1991 | Nishigaki et al. ............ 364/200 |
| 5,170,480 A | * | 12/1992 | Mohan et al. ............... 707/201 |
| 5,280,611 A | | 1/1994 | Mohan et al. ............... 395/600 |
| 5,381,545 A | * | 1/1995 | Baker et al. .................. 714/19 |
| 6,023,707 A | * | 2/2000 | Hamada et al. ............. 707/202 |

\* cited by examiner

Primary Examiner—Jack M. Choules
(74) Attorney, Agent, or Firm—Chapin & Huang, L.L.C.; David E. Huang, Esq.

(57) ABSTRACT

The invention is directed to techniques for modifying a database. A database manager receives operation entries to be applied to a database. The database manager generates an error detection value for each operation entry as it is received, and enters both the operation entry and its associated error detection value in a journal. The database manager then copies the database to another version of the database, checks the validity of each operation entry using the error detection value, and, if the operation entry is valid, updates the copied version of the database based on the operation entry. The database manager also generates an error detection value for the database after it has been updated with all the operation entries from the journal. If there is a data corruption event, such as a power failure, then the database manager uses the error detection values for the operation entries and for the database during the database recovery process.

22 Claims, 8 Drawing Sheets

METHODS AND APPARATUS FOR MODIFYING A DATABASE

BACKGROUND OF THE INVENTION

Historically, computer systems have stored data on a storage medium, such as in a file or database stored on a hard disk drive. However, such a storage medium is vulnerable to data loss due to a data corruption event, such as a physical failure of the hard disk or a power failure that suddenly shuts down the computer system. For example, such an event can corrupt the stored data by interrupting the writing of a block of data to a hard disk. Such a data corruption event can also cause a data file to be updated inconsistently, because a data change affecting different parts of the file is not applied to all of the parts of the file due to the event. Thus, some parts of the file are updated, and some parts that should be updated are not. In addition, a power surge due to a shutdown of the computer system, lightning strike, or problem in the external power source (e.g., electrical power utility) can cause an electrical signal or surge that results in data loss to different parts of the storage medium, such as a hard disk, resulting in a data file that is no longer valid.

Computer systems have mechanisms which guard against losing data. In one conventional approach, the computer system relies on a backup system to back up data files from the storage medium. Typically, the backups occur based on a predetermined time period or regular schedule, such as a daily backup. The backups can be a complete backup of all files on the storage medium, or can be an incremental backup. For example, an incremental backup system backs up only those data files that have changed within the time period.

In another conventional approach, an operating system provides for file system journaling for operations such as purging files or modifying directories, which is useful when there is an unexpected shutdown of the operating system or computer, or some other problem occurs that affects the state of the file system. In a further conventional approach, a computer system, an application executing on the computer system, or a database maintains a transaction log, which can be used to reinitiate the transactions interrupted or never initiated due to a data corruption event.

SUMMARY OF THE INVENTION

In the case of a failure, the conventional backup approach typically requires that a backup tape be located, often by a human operator, loaded on a tape drive, and read by the computer system to locate the files that have been corrupted. This approach can be time consuming and subject to failure if the backup tapes themselves fail for some reason, or human operators do not run the backup tapes reliably. The recovery process can be complicated when incremental backups are used, because, if a substantial number of files are lost, then several different incremental backup tapes may have to be located to recover all the files that were compromised.

In conventional approaches, such as those using a log or journal, there is typically no guarantee that the log or journal itself is not corrupt, or that a saved or retrieved version of a database is not also corrupted by the corruption event. Thus, in conventional approaches, a corrupt log or journal may be used to update a valid previous version of a database, leading to an invalid update to the database. Alternatively, in conventional approaches, a valid log or journal may be applied to a corrupt previous version of a database, also leading to an update to the database that is invalid.

The problem of recovering a corrupted database is more acute for computerized devices that may be shut down routinely by a power disconnection or other means. For example, this problem often applies to a network of devices, such as a router or other devices used in a content distribution network (CDN). Such network devices typically maintain a database (or hash table) including an identifier and configuration information for other similar devices on a network. The devices may be subject to sudden shutdowns because users expect to be able to disconnect the power cord, move or service the device, and reconnect the device as needed, without performing a backup procedure, or checking to see if a backup or journaling system is working properly. Such network devices typically are computers that do not provide such user-oriented input/output devices as graphic displays or keyboards for human users that would allow easy access to perform manual checking of backup or journaling systems. Thus, there is a need for a robust automatic recovery system designed to maintain such a database or hash table in such a device and enable rapid recovery of a valid version of the database if it is corrupted by a sudden shutdown or power surge.

In contrast, the invention is directed to techniques for modifying a database based on journals that include operations to be performed on the database. The journals enable verification of the validity of the operations prior to modifying the database in order to prevent corruption of the database due to the processing of an invalid operation. Furthermore, the journals enable recreation or recovery of the database using an older version of the database and archived journals.

In one arrangement, a database manager functions on a computerized device, such as a network device, to provide a robust recovery system for a database accessed by the computerized device. The database manager receives operations to be performed on the database, such as a write operation that enters a new data value or modifies an existing data value in the database, over a network or from some other source. The database manager enters the operations as operation records in a journal and generates an error detection value, such as a message digest, that can be used to check the validity of each operation record. The operation records are entered in the journal in the sequence to be used when applying the operation records to modify the database. After a predetermined number of entries have been made (or after a preset time period), the database manager copies the existing database to a new version of the database and modifies the copied database based on the operation entries from the journal. The database manager then generates an error detection number for the modified version of the database and clears the entries from the journal, so that a revised version of the journal can be started. The database manager then adds additional operation records to a revised version of the journal, makes a new copy of the modified database, and modifies the copy of the modified database with the additional operation records. The database manager then continues a process of clearing the journal, producing new versions of the journal with additional operation entries, and producing new modified versions of the database.

If there is a data corruption event, the database manager can check the validity of earlier versions of the database by using the error detection number for each database. The database manager can thus determine the most recent valid version of the database. Assuming, for example, that the current database is invalid, then the database manager checks the different versions of the journals and applies the versions of the journals to the most recent valid version of the database to produce a current, valid version of the database. The database manager checks the validity of each operation entry in each journal by checking the error detection number for each operation entry. Thus, the database manager uses the verified operation entries to revise the most recent valid version of the database until encountering an operation entry that is not valid, as indicated by the error detection number for that operation entry. The database manager can then generate an error signal indicating that the database has been partially recovered, and provides the signal to the computerized device or over the network to some destination, such as a network monitoring computer operated by a human operator. Then, for example, the monitoring computer or human operator can determine if the partial recovery is sufficient or locate an archived or backup copy of the database if one is available.

In one embodiment, the invention is directed to a method in a computer system for updating a database. The method includes entering operation entries in a sequence in a journal, copying the first database to a second database, and modifying the second database by applying the operations defined in the operation entries in the sequence indicated by the journal to the second database. The operation entries define operations suitable for modifying a first database. Thus, the state of the first database is preserved and a database manager can save the first database, for example to an archive containing different versions of the database.

In another embodiment, the method includes generating an error detection value for each operation entry, entering the error detection value in the journal, and verifying the validity of each operation entry based on the error detection value for that operation entry. For example, the error detection value is a one-way hash value that provides a value based on the operation entry, and which is different for each operation entry (to a high level of probability). Thus, a database manager or other program can verify the validity of each individual operation entry.

The method includes, in another embodiment, providing a message digest for each operation entry. Thus, the error detection value is a message digest, such as an MD5 message digest.

In a further embodiment, the method includes generating a first error detection value for the first database and, after modifying the second database, a second error detection value for the second database. Thus, each version of the database has its own error detection value that can be used at a later point in time to verify the database.

In another embodiment, the method includes verifying the validity of the second database based on the second error detection value and, if the second database is valid, generating a first output indicating that the second database is valid. The method also includes, if the second database is not valid, verifying the validity of the first database based on the first error detection value, copying the first database to a third database, modifying the third database by applying the operations defined in the operation entries in the sequence indicated by the journal to the third database, and generating a second output indicating that the second database is not valid and the third database is valid. Thus, the database manager can use the error detection value to verify a version of the database and check whether that version is valid or not.

In an additional embodiment, the method includes clearing the operation entries from the journal in response to one of the first output and the second output. Thus, the database manager, or another program, clears the journal after an indication that there is a valid version of the database. The computer system or database manager can now provide additional operation entries for the journal, as new operation entries are received or generated.

In a further embodiment, the method includes providing a first message digest for the first database and, after the step of modifying the second database, a second message digest for the second database. Thus, the error detection value for each database is a message digest.

In another embodiment, the method includes clearing the operation entries from the journal to produce an empty version of the journal. The method also includes providing saved journals by repeating, as long as additional operation entries are received, steps (i) through (iv), as follows: (i) producing a revised version of the journal by entering the additional operation entries in the empty version of the journal, (ii) generating a revised version of the database based on modifying a copy of a current version of the database based on the additional operation entries retrieved from the revised version of the journal, (iii) saving the revised version of the journal to one of the saved journals having an identifier that identifies the saved journal uniquely in comparison to other saved journals, and (iv) removing the additional operation entries from the journal to produce the empty version of the journal. The database manager, or other program, continues the process of receiving additional operation entries, adding the entries to a journal, and updating additional versions of the database.

In another embodiment, the method includes selecting one of the saved journals based on the identifier for that journal and modifying a retrieved version of the database based on retrieving the additional operation entries from the selected saved journal. Thus, a saved journal can be used to update the database based on retrieving an earlier version of the database.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for modifying a database based on journals that include the operations to be performed on the database. A computerized device, such as a network device, receives or generates operation entries, such as operations for writing values or deleting database entries, to be applied to the database maintained on the device. A database manager (e.g., a computer processor operating in accordance with an operating system, application, or other software program fulfilling the techniques of the invention) enters operation entries in a journal of operations for the database. The database manager then generates an error detection number for each operation entry. On a predetermined basis, such as a preset time interval, the database manager copies the database and applies the operation entries from the journal to the copy of the database to produce a modified version of the database. The database manager then generates an error detection number for the modified version of the database. The database manager then copies the journal to a saved version of the journal, deletes the entries in the journal, and begins entering new entries in the journal.

If there is a data corruption event, such as a sudden shutdown or interruption of power, and the current version of the database is corrupted, then the database manager can retrieve the most recent valid version of the database, by checking the error detection number associated with each version of the database. Then the database manager retrieves the saved journals that are needed to update the most recent valid version of the database to match the database before the corruption event. The database manager then modifies the most recent valid database using the operation entries from the selected journals. The database manager verifies each operation entry with the error detection number for that entry before applying the entry to modify the most recent valid database. If an operation entry itself is corrupted, the database can only be partially recovered, that is, recovered only up to the point of the last valid operation entry before the corrupted operation entry. The database manager can then produce an error signal to notify the device, a monitoring computer, or a human operator that only a partial recovery of the database has been accomplished. Then, for example, a monitoring computer decides whether the partial recovery of the database is sufficient, or another version of the database can be located from some other source, such as a conventional backup tape.

Figure 1:
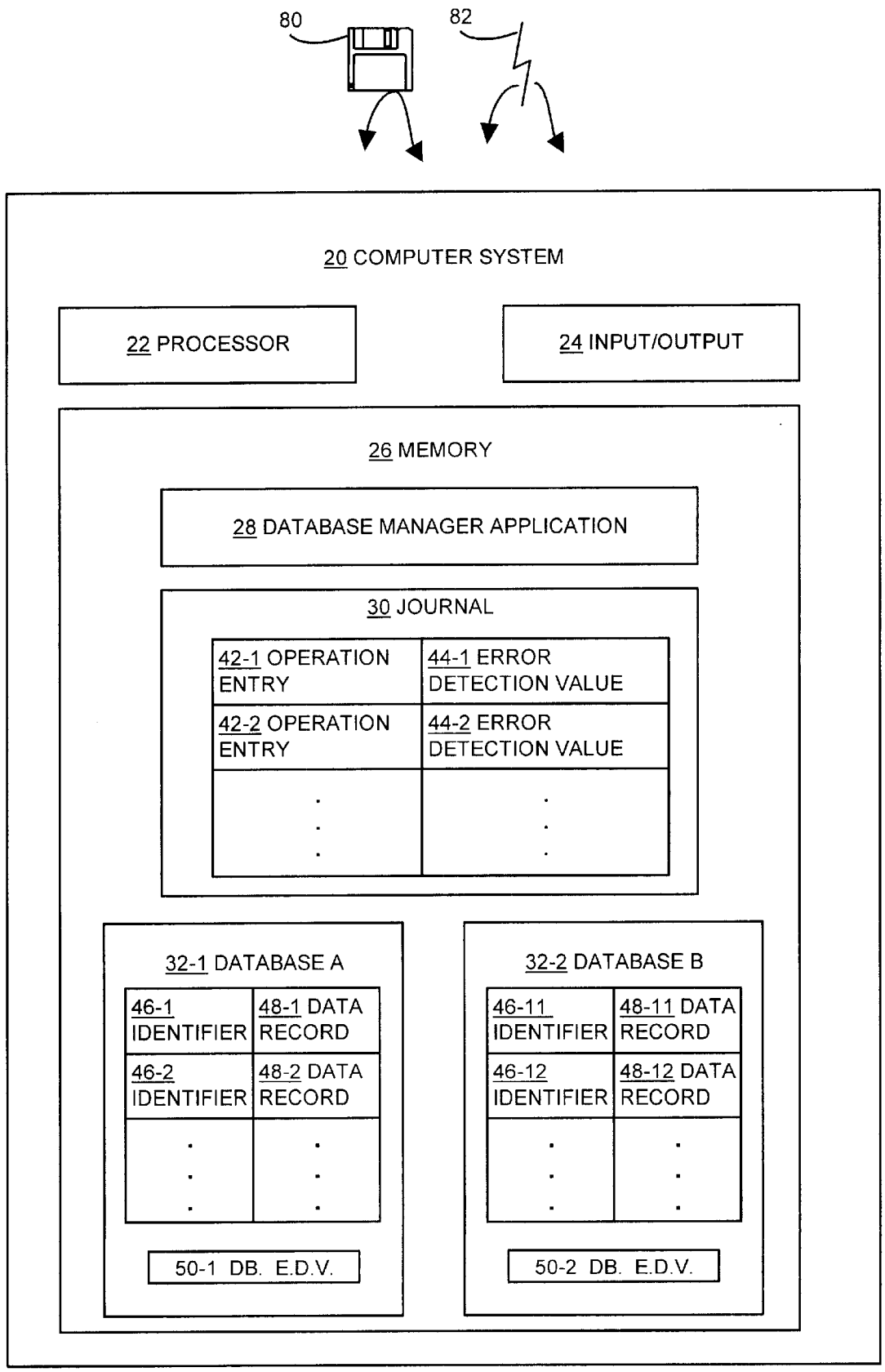
FIG. 1 shows a block diagram of a computer system including a processor, input/output interface, memory, database manager, journal, and two databases, which is suitable for use by the invention.

FIG. 1 shows a block diagram of a computer system 20 including a processor 22, input/output interface 24, memory 26, database manager application 28, journal 30, database A 32-1, and database B 32-2, which is suitable for use by the invention. The databases 32-1 and 32-2 are referred to generally herein as database 32. The processor 22, when operating in accordance with the instructions of the database manager application 28, forms the earlier described database manager that stores operation entries 42 in the journal 30 and modifies the database 32 based on the stored operation entries 42.

The computer system 20 is a digital data processing system, such as a computer, network device, or server. In one example, the computer system 20 is a network device, such as a network distribution device used to control the distribution of information in a CDN (content distribution network) operating in conjunction with a number of other similar network devices located throughout a network. The processor 22 is a digital data processor, for example, an Intel® microprocessor or other processor 22 suitable for use in a network device. The input/output interface 24 is a interface providing input and output communications to other computer systems or network devices, such as a network interface card (NIC) and accompanying software that controls the NIC. The memory 26 is a data storage module, such as a RAM (random access memory) and/or hard disk storage device.

The journal 30 is a software entity, for example, a file, that includes operation entries 42-1, 42-2 (referred to generally as operation entry 42) and error detection values 44-1, 44-2 (referred to generally as error detection value 44). Each operation entry 42 is data entered in the journal 30 that identifies an operation suitable for modifying a database 32. For example, the operation is a write operation that writes data to the database 32. In another example, the operation is a remove or delete operation that deletes data from the database 32. Each error detection value 44 is a number or value generated from the operation entry 42 that is suitable for use in verifying whether the operation entry 42 is valid. For example, the error detection value 44 is a hash value generated by applying a one-way hash function to the operation entry 42. At a later point in time, for example after a data corruption event, the database manager again applies the one-way hash function to the operation entry 42 to generate a new hash value (i.e., error detection value). If this new value is the same as the error detection value 44 originally generated for the operation entry 42, then the database manager considers the operation entry 42 to be verified to a very high level of probability (the specific level of probability depending on the algorithm used in the one-way hash function).

The database 32 is a database suitable for use with the computer system 20 to which the processor 22 reads and writes data. For example, the data includes identifiers 46-1, 46-2, 46-11, and 46-12 (referred to generally as identifiers 46) and data records 48-1, 48-2, 48-11, and 48-12 (referred to generally as data records 48). Each identifier 46 is a name, number, string of characters, or data that identifies some entity, such as a network device that the computer system 20 is in communication with. Each data record 48 includes data related to each identifier 46, such as configuration information for a network device identified by the identifier 46. Each database 32-1, 32-2 includes a respective database error detection value 50-1, 50-2 (referred to generally as database error detection value 50). For example, the error detection value 50 is a hash value generated by applying a one-way hash function to the database 32 as a whole. At a later point in time, for example after a data corruption event, the database manager applies the one-way hash function to the database B 32-2 to generate a new hash value (i.e., error detection value). If this new error detection value 50 is the same as the error detection value 50-2 originally generated for database B 32-2, then the database B 32-2 is verified.

The database manager application 28 provides instructions for controlling and coordinating the journal 30 and database 32. The instructions of the database manager application 28 execute on the processor 22 to form a database manager that manages the journal 30 and database 32, for example by recording operation entries 42 and error detection values 44 in the journal 30. The database manager uses the operation entries 42 to enter or revise identifiers 46 and data records 48 in one or both database 32 (as will be described in more detail for FIG. 2 through FIG. 4).

In one embodiment, a computer program product 80 including a computer readable medium (e.g. one or more CDROM's, diskettes, tapes, etc.) provides software instructions for the database manager. The computer program product 80 can be installed by any suitable software installation procedure, as is well known in the art. In another embodiment, the software instructions can also be downloaded over a wireless connection. A computer program propagated signal product 82 embodied on a propagated signal on a propagation medium (e.g. a radio wave, an infrared wave, a laser wave, sound wave, or an electrical wave propagated over the Internet or other network) provides software instructions for the database manager. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 80 is a propagation medium that the computer can receive and read, such as by receiving the propagation medium and identifying a propagated signal embodied in the propagation medium, as described above for the computer program propagated signal product 82.

Figure 2:
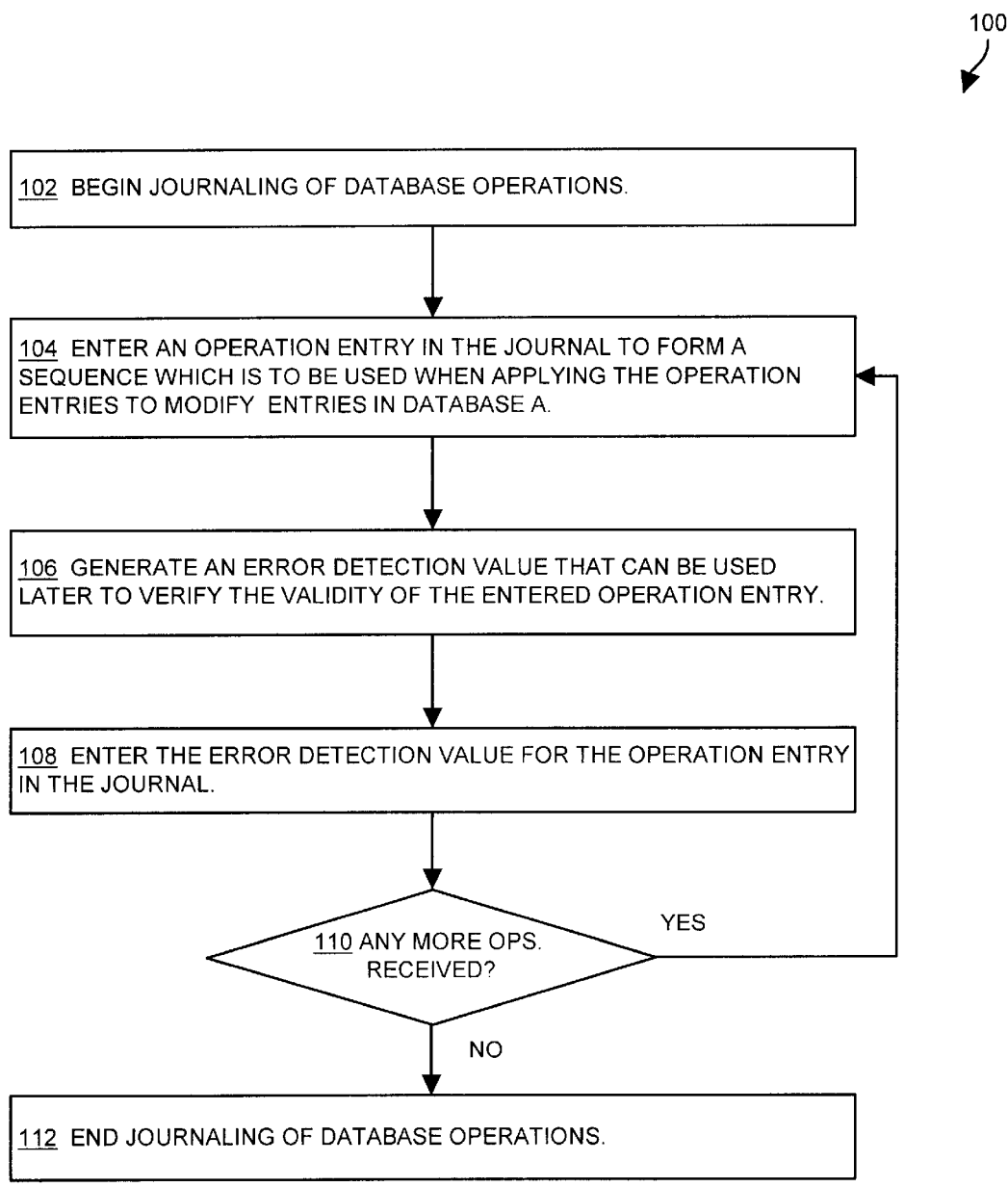
FIG. 2 shows a flow diagram of a procedure for providing operation entries that are suitable for updating a database, according to an embodiment of the invention.

FIG. 2 shows a flow diagram of a procedure 100 for providing operation entries 42 in a journal 30 that are suitable for updating a database 32, according to an embodiment of the invention. In step 102, the database manager (i.e., the processor 22 operating in accordance with the database manager application 28) begins journaling of database operations. For example, the computer system 20 receives instructions through the input/output interface 24 from a network device indicating to add information to the database 32 about that network device. The database manager receives this instruction and generates a write operation to add the information about the network device, but does not yet apply the write operation to the database 32.

In step 104, the database manager enters an operation entry 42 in the journal 30 to form a sequence which is to be used when applying the operation entries 42 to modify the entries 46, 48 in the database 32. For the example of a write operation, the database manager enters the write operation entry 42 in the journal 30, for example, as operation entry 42-2, but does not yet apply the operation entry 42-2 to the database 32.

In step 106, the database manager generates an error detection value 44 that can be used later to verify the validity of the entered operation entry 42 (as described previously for FIG. 1), and, in step 108, enters the error detection value 44 for the operation entry 42 in the journal 30. For example, if the database manager enters the write operation as operation entry 42-2, then the database manager generates an error detection value 44 based on the operation entry 42-2 and enters it as error detection value 44-2 in the journal 30.

In step 110, the database manager checks whether it has received instructions for any additional operation entries 42. If the database manager receives instructions indicating that additional operation entries 42 should be entered, then the database manager restarts the journaling of the operation entries 42, by returning to step 104. In addition, the database manager may halt the journaling process if a predetermined limit has been reached (e.g., a preset number of operation entries, or preset time limit).

In step 112, the database manager ends journaling of database operations. The database manager then updates the database 32 based on the operations entries 42 recorded in the journal 30 (as described in FIG. 3). If the database manager receives additional operation entries 42, it begins again to journal the newly received operation entries 42 (step 102).

Figure 3:
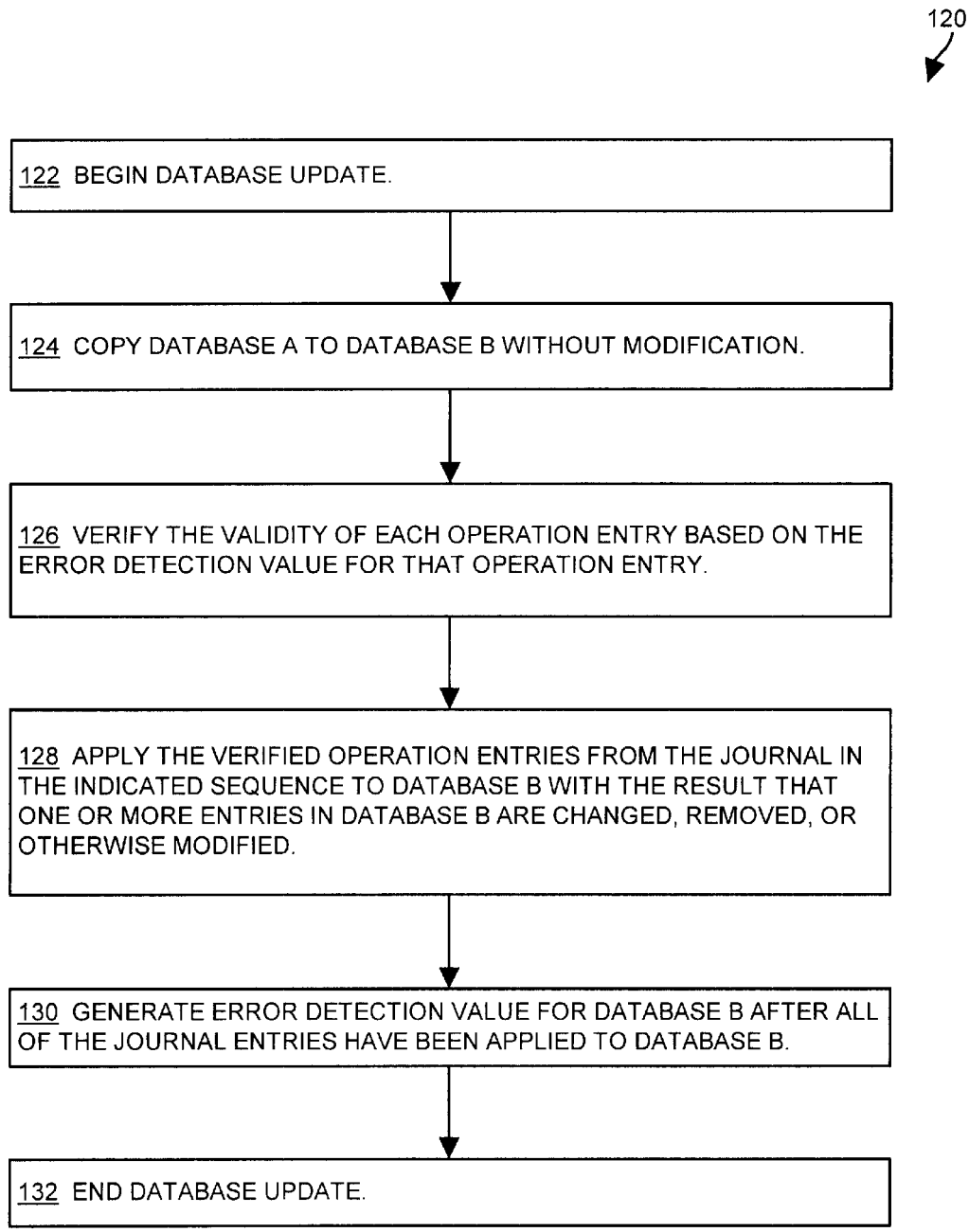
FIG. 3 shows a flow diagram of a procedure for updating a database, based on the operation entries provided by the procedure of FIG. 2.

FIG. 3 shows a flow diagram of a procedure 120 for updating a database 32, according to an embodiment of the invention. In step 122, the database manager begins the update of the database 32. The database manager begins the update based on varying criteria. For example, the database manager begins updating the database 32 after a predetermined number of operation entries 42 have been entered in the database 32, for example after 100 operation entries 42 have been entered. Alternatively, the database manager begins the update after a preset time period, such as 30 minutes, and applies all operation entries 42 entered in the journal 30 during this time period.

In step 124, the database manager copies database A 32-1 to database B 32-2 without yet performing any modification to either database A 32-1 or database B 32-2.

In step 126, the database manager verifies the validity of each operation entry 42 based on the error detection value 44 for that operation entry 42. For example, the database manager verifies the validity of all operation entries 42 in the journal 30 before using the operation entries 42 to modify database B 32-2. In another example, the database manager verifies the operation entries 42 one by one, and applies each operation entry 42, as it is verified, to database B 32-2. In one embodiment, the database manager 42 does not verify the validity of the operation entries 42 unless there has been an indication of a data corruption event that may have affected the validity of the operation entries 42 in the journal 30 (i.e., step 126 is skipped). In a further embodiment, the database manager uses the operation entries 42 to modify database A 32-1 before copying to database B 32-2.

In step 128, the database manager applies the operation entries 42 from the journal 30 in the indicated sequence (i.e., the sequence the operation entries 42 were entered into the journal 30) to the database B 32-2. As a result, the database manager changes, removes or otherwise modifies one or more entries in the database B 32-2 (e.g., identifiers 46 and/or data records 48). For example, one type of change is implemented by a write operation that enters a new data in the data record 48 for an existing identifier 46 in the database B 32-2. For example, a write operation includes an identifier 46 (e.g., for a network device) and a new data record 48 (e.g., configuration values) to be associated with that identifier 46. In this example, the database manager locates 46-12 as the identifier, and replaces the data in the data record 48-12 with the new data provided in the write operation. In another example, a remove operation deletes both the identifier 46 and its associated data record 48 in the database B 32-2. For example, the database manager locates 46-11 as the matching the identifier included in the remove operation and then deletes both the identifier 46-11 and data record 48-12 from the database B 32-2.

In step 130, the database manager generates an error detection value 50-2 for database B 32-2 after applying all of the operation entries 42 from the journal 30 to database B 32-2. At a later point in time, the database manager uses the error detection value 50-2 to determine if database B 32-2 is not valid (e.g., whether database 32-2 was corrupted by a data corruption event). (The error detection value 50-1 shown in FIG. 1 was calculated for database A 32-1 at a previous point in time, for example just before copying database A 32-1 to database B 32-2.)

In step 132, the database manager ends the database update of database B 32-2. The database manager may return to the journaling process 100 (see, e.g., FIG. 5). In another embodiment, the database manager modifies database B 32-2 with additional operation entries 42 (in effect, returning to step 126).

Figure 4:
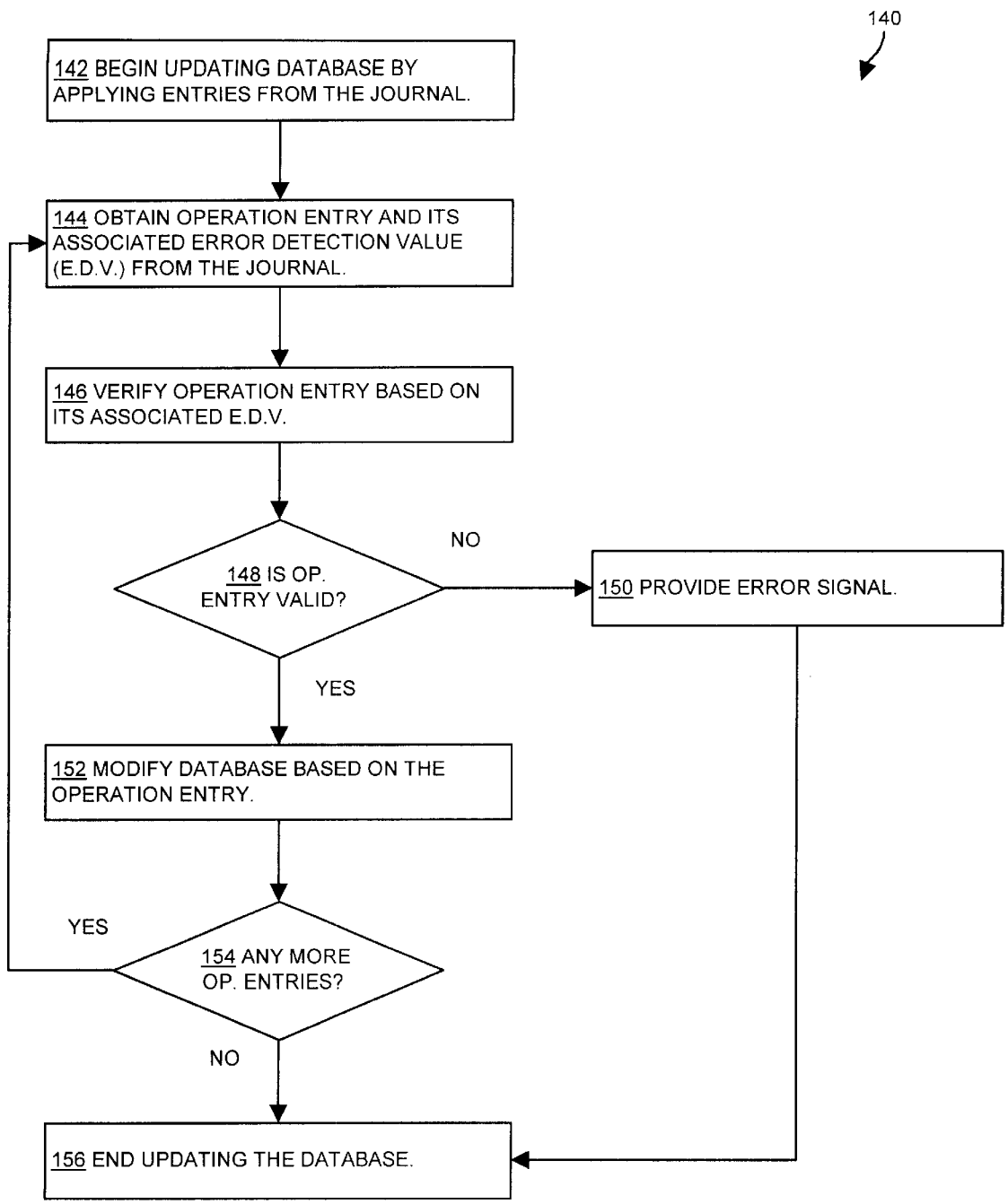
FIG. 4 shows a flow diagram of a procedure for verifying and applying operation entries to a database for the procedure of FIG. 3.

FIG. 4 shows a flow diagram of a procedure 140 for verifying and applying operation entries 42 to a database 32, according to an embodiment of the invention. The procedure 140 is suitable for use as steps 126 and 128 of FIG. 3.

In step 142, the database manager begins updating database B 32-2 by applying the operation entries 42 from the journal 30. In step 144, the database manager obtains the operation entry 42 and its associated error detection value 44 from the journal 30. For example, the database manager opens the journal 30 (e.g., a file existing in the file system of the computer system 20) and reads the operation entry 42-1 and error detection value 44-1 from the journal 30.

In step 146, the database manager verifies the operation entry 42 based on its associated error detection value 44. For example, the database manager generates a new error detection value 44 based on the operation entry 42-1 as read from the file for the journal 30 and compares the newly generated error detection value 44 to the stored error detection value 44-1 obtained from the file for the journal 30. In step 148, the database manager determines if the operation entry 42-1 is valid. For example, if the newly generated error detection value 44 and the stored error detection value 44-1 are the same, then the database manager considers the operation entry 42-11 to be verified.

In step 150, if the operation entry 42 is not valid, then the database manager provides an error signal. In one example, the database manager provides the error signal to the computer system 20 indicating that database B 32-2 has only been partially updated, which may then try to locate another version of database B 32-2. Alternatively, the database manager decides that the partial update is sufficient (i.e., use the partially updated version of database B 32-2 without further modification) and ends updating of database B 32-2 (step 156).

In step 152, the database manager modifies database B 32-2 based on the operation entry 42. The database manager uses the operation entry 42 to write data to database B 32-2, remove data from database B 32-2, or perform some other operation on the database B32-2.

In step 154, the database manager checks the journal 30 to determine if there are any remaining operation entries 42 in the journal 30. If there are one or more remaining operation entries 42 in the journal 30, then the database manager returns to step 144. If there are no more operation entries 42, then the database manger ends the updating of database B 32-2 (step 156).

Figure 5:
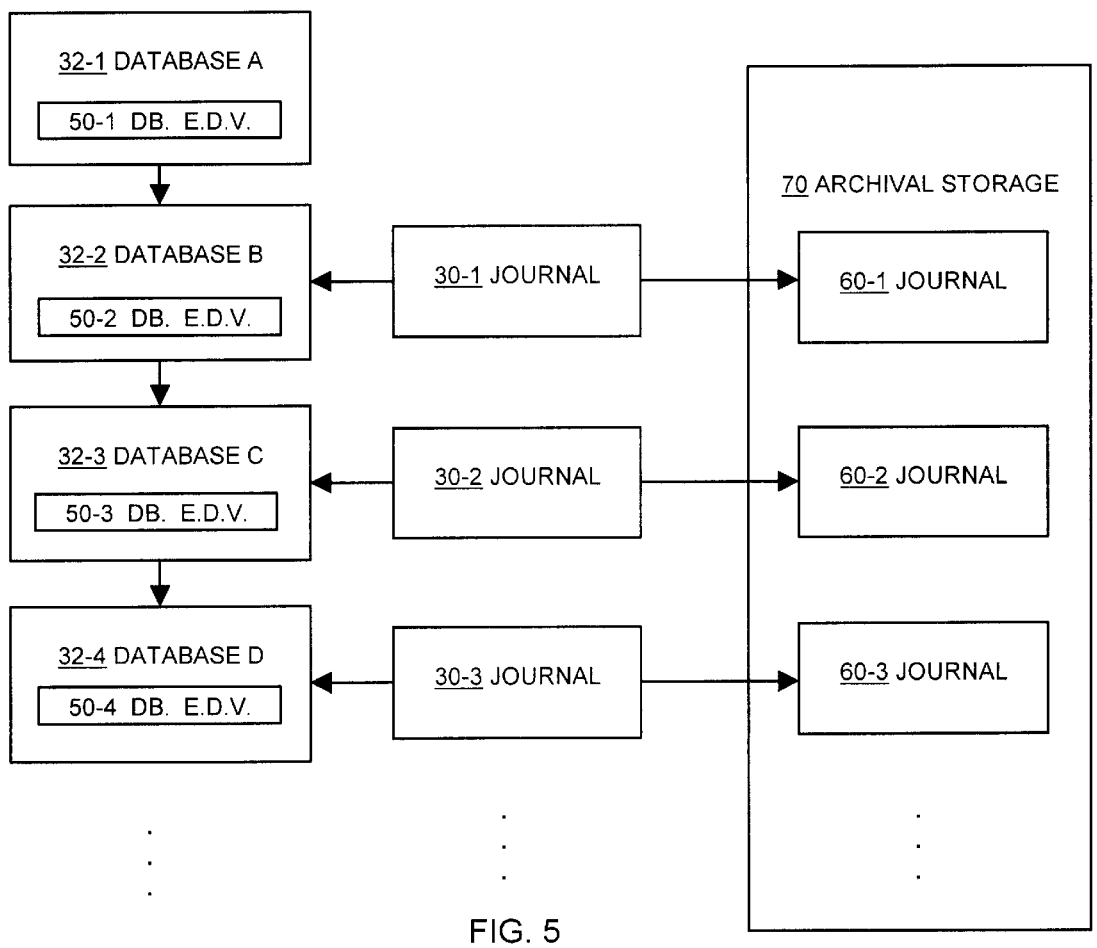
FIG. 5 shows, by way of example only, a block diagram of databases, journals used to update the databases, and copies of the journals stored in archival storage.

FIG. 5 shows, by way of example only, a block diagram of databases 32, journals 30 used to update the databases, and copies of the journals 60 stored in archival storage 70. The databases 32 include different versions of a database (database A 32-1, database B 32-2, database C 32-3, and database D 32-4). The database manager updates each database 32 with operations based on operation entries 42 from different versions of the journal (30-1, 30-2, and 30-3) as described in the flowchart for FIG. 6. The database manager saves copies of each journal 30-1, 30-2, and 30-3 in respective archival copies of the journals 60-1, 60-2, and 60-3 in the archival storage 70.

The archival storage 70 is a database or other storage, such as a computer data tape, suitable for storing large amounts of data. The archival storage 70 is, in one example, a database residing on or closely associated with the computer system 20. In another example, the archival storage 70 is a database accessible by the computer system 20 through a network connection. In one embodiment, the archival storage 70 also stores copies of the database 32 (not shown in FIG. 5). For example, after the database manager copies database A 32-1 to database B 32-2 and updates database B 32-2, the database manager stores a copy of database A 32-1 in the archival storage 70, and then deletes database A 32-1 from the memory 26.

Figure 6:
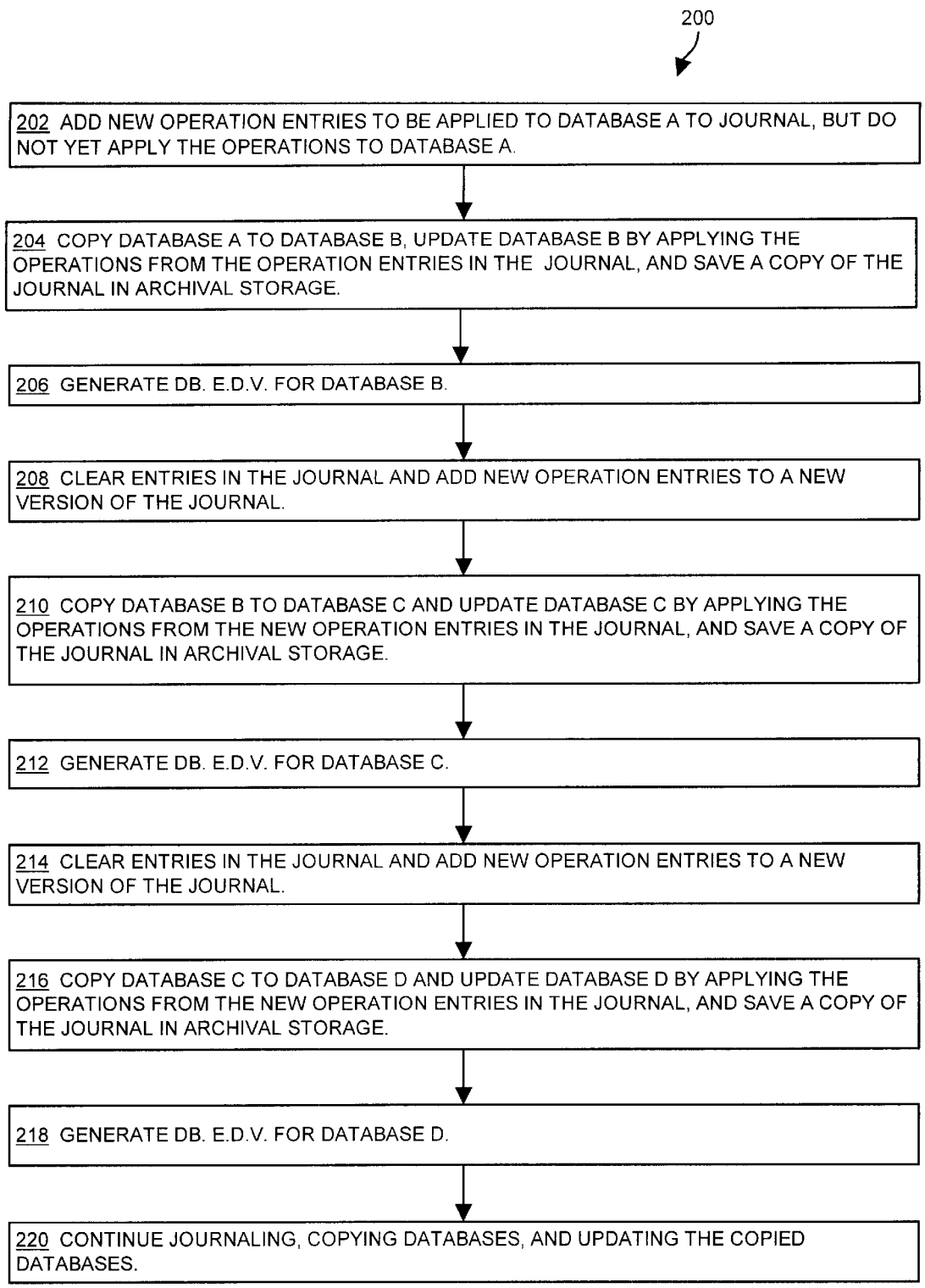
FIG. 6 shows a flow diagram of a procedure for updating databases according to the embodiment of the invention illustrated in FIG. 5.

FIG. 6 shows a flow diagram of a procedure 200 for updating databases 32 according to the example illustrated in FIG. 5.

In step 202, the database manager adds additional operation entries 42 to be applied to database A 32-1 to the journal 30-1, but does not yet apply the operations indicated by the additional operation entries 42 to database A 32-1. In step 204, the database manager copies database A 32-1 to database B 32-2 and updates database B 32-2 by applying the operations indicated by the operation entries 42 in the journal 30-1 (as described in FIG. 3 and FIG. 4). The database manger saves a copy of the journal 30 (e.g., saves journal 30-1 to archival storage as journal 60-1). In step 206, the database manager generates a database error detection value 50-2 for database B 32-2.

In step 208, the database manager clears (e.g., deletes) the operation entries 42 and error detection values 44 from the journal 30-1 to produce an empty or blank journal 30-2. As it receives instruction for new additional operations on the database 32, the database manager adds the additional operation entries 42 to the new version of the journal 30-2. The database manager also generates new error detection values 44 for the additional operation entries 42 in the journal 30-2. In step 210, the database manager copies database B 32-2 to database C 32-3 and updates database C 32-3 by applying the operations indicated by the operation entries 42 in the journal 30-2. The database manger saves a copy of the journal 30-2 to archival storage 70 as journal 60-2. In step 212, the database manager generates a database error detection value 50-3 for database C 32-3.

In step 214, the database manager clears the operation entries 42 and error detection values 44 from the journal 30-2 to produce an empty or blank journal 30-3. As it receives instruction for new operations on the database 32, the database manager adds new operation entries 42 to the new version of the journal 30-3. The database manager also generates new error detection values 44 for the new operation entries 42 in the journal 30-3. In step 216, the database manager copies database C 32-3 to database D 32-4 and updates database D 32-4 by applying the operations indicated by the operation entries 42 in the journal 30-3. The database manger saves a copy of the journal 30-3 to archival storage 70 as journal 60-3. In step 218, the database manager generates a database error detection value 50-4 for database D 32-4.

In step 220, the database manager continues entering operation entries 42 in additional versions of the journal 30, copying the database 32 to additional versions of the database 32, and updating the copied databases 32 with the operation entries 42 from the additional versions of the journals 30. The procedure 200 continues as long as the database manager receives instructions for additional operations to be performed on the database 32.

Figure 7:
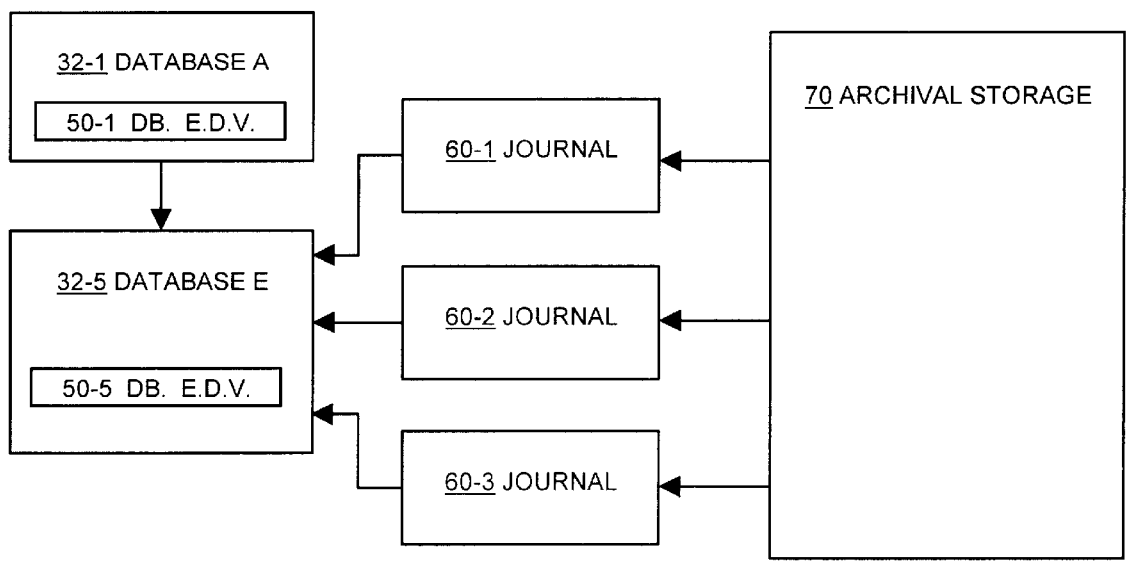
FIG. 7 shows, by way of example only, a block diagram of databases and copies of journals recovered from archival storage.

FIG. 7 shows, by way of example only, a block diagram of databases 32 and copies of journals 60 recovered from archival storage. Database E 32-5 is a copy of database A 32-1, which the database manager updates as described in FIG. 8. The journals 60-1, 60-2, and 60-3 represent saved copies of journals 30-1, 30-2, and 30-3 from archival storage 70 (see also FIG. 6).

Figure 8:
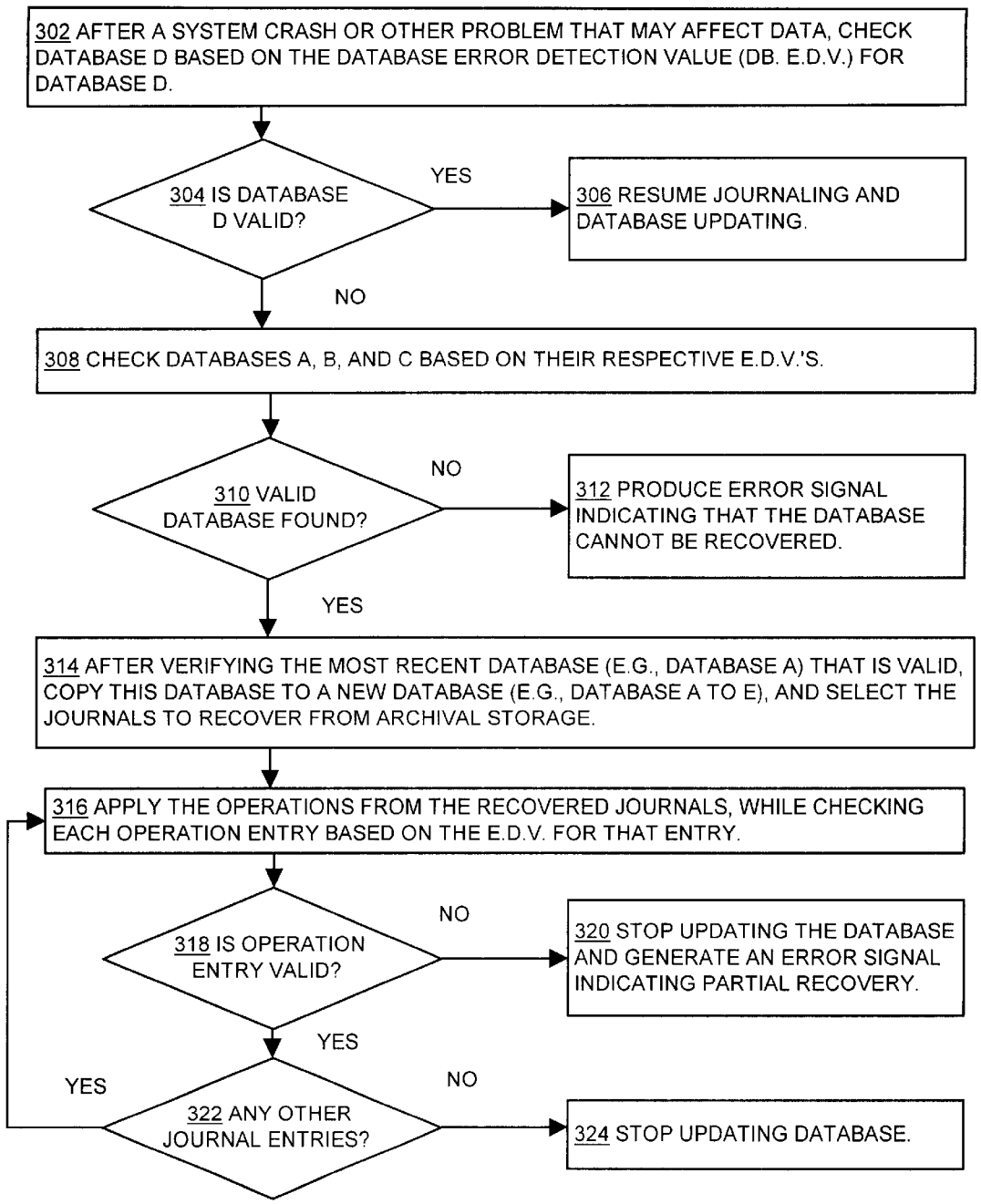
FIG. 8 shows a flow diagram of a procedure for updating a database based on journals recovered from archival storage, according to the embodiment of the invention illustrated in FIG. 7.

FIG. 8 shows a flow diagram of a sample procedure 300 for updating database E 32-5 based on the journals 60-1, 60-2, and 60-3 recovered from archival storage 70, according to the embodiment of the invention illustrated in FIG. 7.

In step 302, after a data corruption event (e.g., system crash or other problem that may affect data), the database manager checks database D 32-4 (see FIG. 5) based on the database error detection value 50-4 for database D 32-4. The database manager generates a new error detection value 50 for database D 32-4. In step 304, the database manager determines if database D 32-4 is valid by comparing the newly generated error detection value 50 for database D 32-4 to the previously generated error detection value 50-4. If the two error detection values for database D 32-4 are the same, then database D 32-4 is still valid, and, in step 306, the database manager resumes the journaling of database entries 42 and updating of databases 32, as described in procedure 200 in FIG. 6.

If the two error detection values 50 for database D 32-4 are not the same, then database D 32-4 is not valid, and, in step 308, the database manager checks database A 32-1, database B 32-2, and database C 32-3 based on their respective error detection values, 50-1, 50-2, and 50-3. In step 310, the database manager determines if any of the databases 32-1, 32-2, and 32-3 are found to be valid. If the database manager finds that none of the databases 32-1, 32-2, 32-3, and 32-4 are valid, then, in step 312, the database manager produces an error signal indicating that the database 32 cannot be recovered. The database manager sends the error signal to the computer system 20, to a monitoring. computer, and/or to a human operator, who may decide to take some other action, such as trying to recover some other version of the database 32 from archival storage 70 or a backup device, such as a conventional backup tape.

The database manager is not able to verify in step 310 that any of the databases 32-2, 32-3, and 32-4 are valid, but, in step 314, the database manager is able to verify that database A 32-1 is valid (referred to as the most recent valid database) based on the error detection value 50-1 for database A 32-1. The database manager then copies database A 32-1 to a new database, database E 32-5. The database manager selects the journals 60-1, 60-2, and 60-3 that must be recovered from archival storage 70 in order to update database E 32-5. These journals 60-1, 60-2, and 60-3, include the operations entries 42 used by the database manager to create database B 32-2, database C 32-3, and database D 32-4 (see FIG. 5).

In step 316 the database manager applies the operations indicated by the operation entries 42 from the recovered journals 60-1, 60-2, and 60-3. For each operation entry 42, the database manager checks the operation entry 42 based on the respective error detection value 44.

In step 318, the database manager attempts to verify the validity of the operation entry 42. In step 320, the database manager cannot verify the validity of the operation entry 42, the database manager does not update database E 32-5 for that operation entry 42 and generates an error signal indicating that the database 32-5 has only been partially recovered. Alternatively, the database manager considers the partial recovery to be sufficient and thus treats the database E 32-5 as the current valid version of the database 32.

In step 322, the database manager checks to determine if there are any other remaining operation entries 42 in the journal 60-1, 60-2, or 60-3. If there are other operation entries 42, then the database manager checks the next operation entry 42 from the journal 60-1, 60-2, or 60-3, and, if valid, applies the operation indicated by the operation entry 42 to database E 32-5 (i.e., returns to step 316).

In step 324, there are no more operation entries 42 in any of the journals 60-1, 60-2, and 60-3, and the database manager stops updating database E 32-5 and considers it to be fully updated and valid.

While this invention has been particularly shown and described with references to preferred embodiments thereof, it will be understood by those skilled in-the art that various changes in form and details may be made therein without departing from the spirit and scope of the invention as defined by the appended claims.

For example, the computer system 20 suitable for use with the invention is not required to be a computerized network device, but can be any type of system including a computer and databases 32 that require updating by operations that are capable of being entered in a journal 30. The computer system 20 can generate operation entries 42 for the journal 30 based on the processing occurring within the computer system 20, independently of any information received through the input/output interface 24.

In addition, the database manager is not required to be a processor 22 running a software application 28 resident in a memory 26 of the computer 20. The functions of the database manager can be performed by other mechanisms such as analog or logic circuitry, or other hardware (e.g., an ASIC). The instructions of the database manager application 28 can also be integrated into an operating system so that the operating system, when executing on the processor 22, performs the functions of the database manager. In addition, the database manager can function across a network or other connection. Thus, for example, the database manager can reside on a remote computer system and can operate through the input/output interface 24 of the computer system 20 to provide entries 42 to the journal 30 and update the database 32. Alternatively, either the journal 30 or database 32, or both, can reside on a remote computer or database server, while the database manager functions on the computer system 20 and sends instructions to the remote journal 30 and/or remote database 32 through the input/output interface 24. In addition, the database manager can be implemented in a distributed computing or distributed object model. For example, the functions of the database manger application 28 can be implemented as several objects that execute on several processors 22 of several different computers 20, which are in communication with each other.

In a further example, the error detection values 44 and 50 can be generated by any suitable function, such as a checksum, one-way hash, or message digest function. In one embodiment, the error detection values 44 and 50 are generated by an MD5 message digest function. In addition, each error detection value 44 and 50 can be combined with a cryptographic signature or key. The error detection values 44 and 50 can also take the form of parity bits, checksums, error correction values, or other values suitable for use in detecting errors in data. Also, the error detection values 44 are not required to be entered adjacent to the operations entries 42 in the journal 30. The database manager can enter the error detection values 44 in some other location (e.g., a separate table in the journal 30, the header area of a journal file, or a separate file).

In addition, the database manager can enter two or more copies of an operation entry 42 in the database 32, so that if one copy of the operation entry 42 is corrupted, the database manager can determine, using the error detection value 44 for that operation entry 42, whether one of the copies of the operation entry 42 remains valid.

Furthermore, the invention does not require that there be multiple, separate versions of the journal 30. For example, the journal can include all of the operation entries 42 that would otherwise be included in different versions of the journal 30, with each operation entry 42 having a flag that indicates whether that operation entry 42 has been used to update the database 32.

In addition, an operation entry 42 in the journal 30 can include a collection of operations that the database manager applies to the database 32 as one unit (i.e., all of the operations in the operation entry 42 are a group to be completed together). The collection of operations in one operation entry 42 can be write operations, remove operations, and/or other operations that the database manager can apply to the database 32. Thus, the collection of operations can be, for example, any one of the following: one write operation and one remove operation, two write operations, two remove operations, or some other combination of two of more operations. For example, suppose that the collection of operations is two write operations (e.g. to add two identifiers 46 and their associated data records 48 to the database 32). The two write operations include related information such that the database manager should update the database 32 with both write operations, or neither operation. If the database manager includes the two write operations as a collection of operations in one operation entry 42, the database manager can track whether it has completed the operation entry 42, or whether an interruption has occurred, such as one due to a shutdown or power surge. If such an interruption has occurred and the database manager has not completed both write operations, then the database manager considers the operation entry 42 to be incomplete. The database manager can then determine whether to perform some appropriate action, such as generating an error signal or reapplying both write operations in the operation entry 42 to the database 32.

What is claimed is:

1. A method in a computer system for updating a database, comprising the steps of:
   entering operation entries in a sequence in a journal, the operation entries defining operations suitable for modifying a first database;
   copying the first database to a second database; and
   modifying the second database by applying the operations defined in the operation entries in the sequence indicated by the journal to the second database, the modified second database no longer matching the first database.

2. A method in a computer system for updating a database, comprising the steps of:
   entering operation entries in a sequence in a journal, the operation entries defining operations suitable for modifying a first database;
   copying the first database to a second database;
   modifying the second database by applying the operations defined in the operation entries in the sequence indicated by the journal to the second database;
   generating an error detection value for each operation entry;
   entering the error detection value in the journal; and
   verifying the validity of each operation entry based on the error detection value for that operation entry.

3. The method of claim 2, wherein the step of generating the error detection value comprises providing a message digest for each operation entry.

4. The method of claim 1 wherein the first database is initially deemed to be a current version of correct data, and wherein the method further comprises the step of:
   after the step of modifying, deeming (i) the second database as the current version of the correct data, and (ii) the first database to be a non-current archive version of the correct data.

5. A method in a computer system for updating a database, comprising the steps of:
   entering operation entries in a sequence in a journal, the operation entries defining operations suitable for modifying a first database;
   copying the first database to a second database;
   modifying the second database by applying the operations defined in the operation entries in the sequence indicated by the journal to the second database; and
   generating a first error detection value for the first database and, after the step of modifying the second database, a second error detection value for the second database.

6. The method of claim 5, further comprising the steps of:
   verifying the validity of the second database based on the second error detection value; and
   if the second database is valid, generating a first output indicating that the second database is valid; and
   if the second database is invalid,
      verifying the validity of the first database based on the first error detection value,
      copying the first database to a third database,
      modifying the third database by applying the operations defined in the operation entries in the sequence indicated by the journal to the third database, and
      generating a second output indicating that the second database is invalid and the third database is valid.

7. The method of claim 6, further comprising the step of clearing the operation entries from the journal in response to one of the first output and the second output.

8. The method of claim 6, wherein the step of generating comprises providing a first message digest for the first database and, after the step of modifying the second database, a second message digest for the second database.

9. A method in a computer system for updating a database, comprising the steps of:

entering operation entries in a sequence in a journal, the operation entries defining operations suitable for modifying a first database;

copying the first database to a second database;

modifying the second database by applying the operations defined in the operation entries in the sequence indicated by the journal to the second database;

clearing the operation entries from the journal to produce an empty version of the journal; and providing a plurality of saved journals by repeating steps (i) through (iv) as long as additional operation entries are received:
(i) producing a revised version of the journal by entering the additional operation entries in the empty version of the journal;
(ii) generating a revised version of the database based on modifying a copy of a current version of the database based on the additional operation entries retrieved from the revised version of the journal;
(iii) saving the revised version of the journal to one of the saved journals having an identifier that identifies the saved journal uniquely in comparison to other saved journals; and
(iv) removing the additional operation entries from the journal to produce the empty version of the journal.

10. The method of claim 9, further comprising the step of selecting one of the saved journals based on the identifier for that journal and modifying a retrieved version of the database based on retrieving the additional operation entries from the selected saved journal.

11. An apparatus for updating a database, comprising:
a memory that stores a first database and a journal; and
a database manager in communication with the memory, wherein the database manager is configured to:
enter operation entries in a sequence in the journal, the operation entries defining operations suitable for modifying a first database;
copy the first database to a second database in the memory; and
modify the second database by applying the operations defined in the operation entries in the sequence indicated by the journal to the second database to make the modified second database no longer match the first database.

12. The apparatus of claim 11 wherein the first database is initially deemed to be a current version of correct data, and wherein the database manager is further configured to:
after modifying the second database, deem (i) the second database as the current version of the correct data, and (ii) the first database to be a non-current archive version of the correct data.

13. An apparatus for updating a database, comprising:
a memory that stores a first database and a journal, and
a database manager in communication with the memory, wherein the database manager is configured to:
enter operation entries in a sequence in the journal, the operation entries defining operations suitable for modifying a first database;
copy the first database to a second database in the memory; and
modify the second database by applying the operations defined in the operation entries in the sequence indicated by the journal to the second database;
generate an error detection value for each operation entry;
enter the error detection value in the journal; and
verify the validity of each operation entry based on the error detection value for that operation entry.

14. The apparatus of claim 13, wherein the error detection value is a message digest.

15. An apparatus for updating a database, comprising:
a memory that stores a first database and a journal; and
a database manager in communication with the memory, wherein the database manager is configured to:
enter operation entries in a sequence in the journal, the operation entries defining operations suitable for modifying a first database;
copy the first database to a second database in the memory; and
modify the second database by applying the operations defined in the operation entries in the sequence indicated by the journal to the second database; and
provide a first error detection value for the first database and, after modifying the second database, a second error detection value for the second database.

16. The apparatus of claim 15, wherein the database manager is configured to:
verify the validity of the second database based on the second error detection value; and
if the second database is valid, generate a first output indicating that the second database is valid; and
if the second database is invalid,
verify the validity of the first database based on the first error detection value,
copy the first database to a third database,
modify the third database by applying the operations defined in the operation entries in the sequence indicated by the journal to the third database, and
generate a second output indicating that the second database is invalid and the third database is valid.

17. The apparatus of claim 16, wherein the database manager is configured to clear the operation entries from the journal in response to one of the first output and the second output.

18. The apparatus of claim 16, wherein the first error detection value is a first message digest and the second error detection value is a second message digest.

19. An apparatus for updating a database, comprising:
a memory that stores a first database and a journal; and
a database managing means for managing a database, wherein the database managing means is in communication with the memory and is configured to:
enter operation entries in a sequence in the journal, the operation entries defining operations suitable for modifying a first database;
copy the first database to a second database in the memory; and
modify the second database by applying the operations defined in the operation entries in the sequence indicated by the journal to the second database;
generate an error detection value for each operation entry;
enter the error detection value in the journal; and
verify the validity of each operation entry based on the error detection value for that operation entry.

20. A computer program product that includes a computer readable medium having instructions stored thereon for updating a database, such that the instructions, when carried out by a computer, cause the computer to perform the steps of:
entering operation entries in a sequence in a journal, the operation entries defining operations suitable for modifying a first database;

copying the first database to a second database; and modifying the second database by applying the operations defined in the operation entries in the sequence indicated by the journal to the second database;

generating an error detection value for each operation entry;

entering the error detection value in the journal; and verifying the validity of each operation entry based on the error detection value for that operation entry.

21. A computer program propagated signal product embodied in a propagated medium, having instructions for updating a database, such that the instructions, when carried out by a computer, cause the computer to perform the steps of:

entering operation entries in a sequence in a journal, the operation entries defining operations suitable for modifying a first database;

copying the first database to a second database; and modifying the second database by applying the operations defined in the operation entries in the sequence indicated by the journal to the second database;

generating an error detection value for each operation entry;

entering the error detection value in the journal; and verifying the validity of each operation entry based on the error detection value for that operation entry.

22. A journal in a computer system, comprising:

operation entries defining operations suitable for modifying a database; and error detection values corresponding to the operation entries, each error detection value providing an indication of whether a respective operation entry is valid, wherein the error detection values are message digests generated based on the operation entries.

* * * * *